No. 812,934. PATENTED FEB. 20, 1906.
K. KIEFER.
FILTER.
APPLICATION FILED NOV. 21, 1904.
4 SHEETS—SHEET 1.
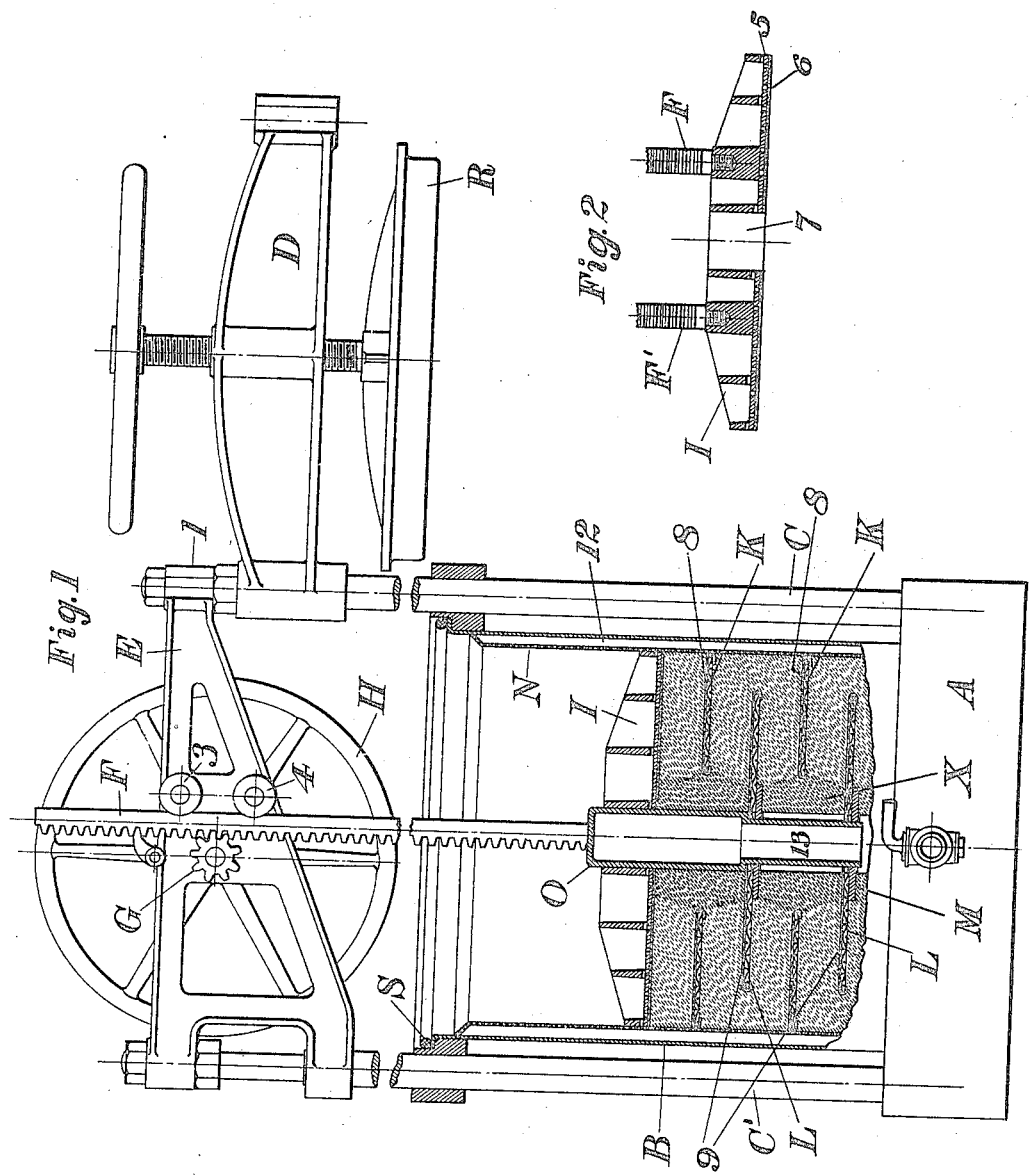
Witnesses.
Inventor.
Karl Kiefer

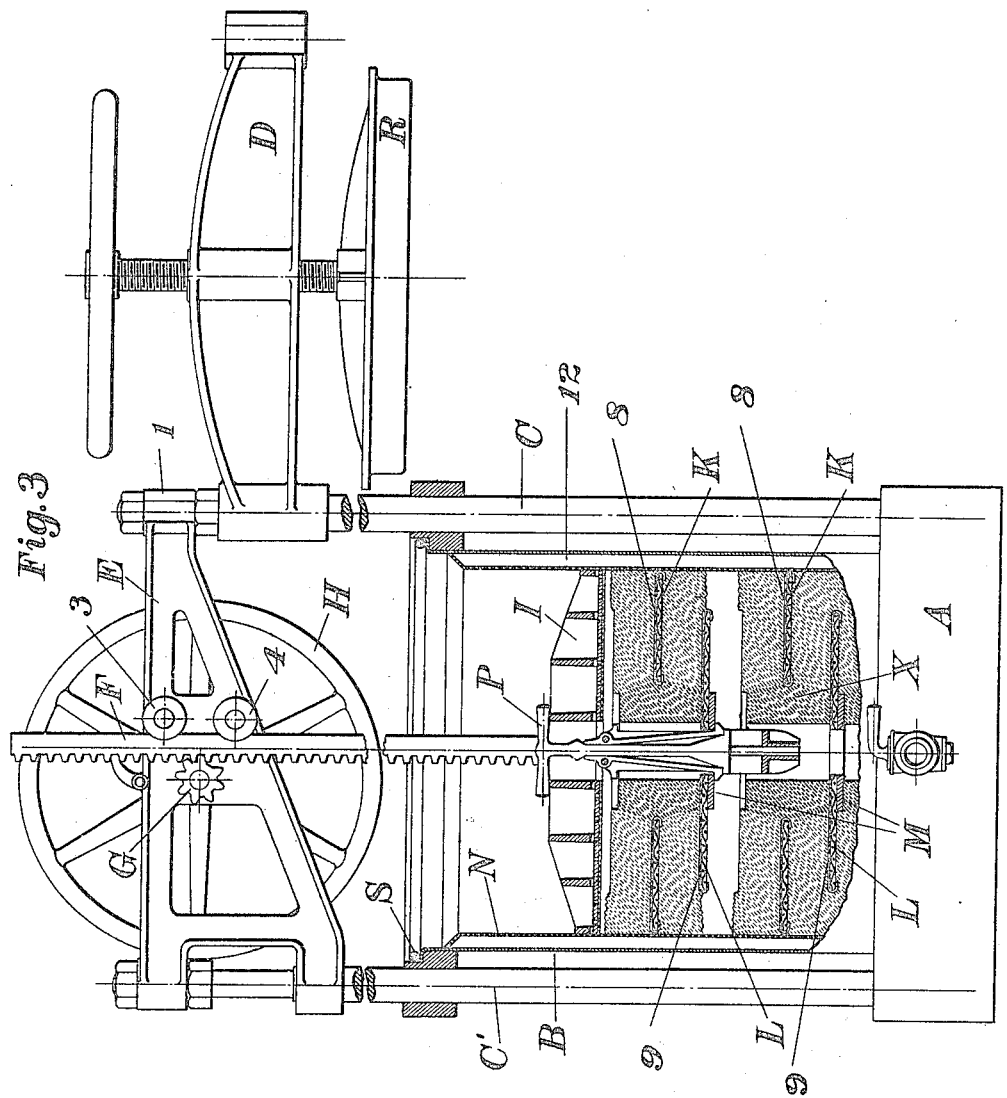

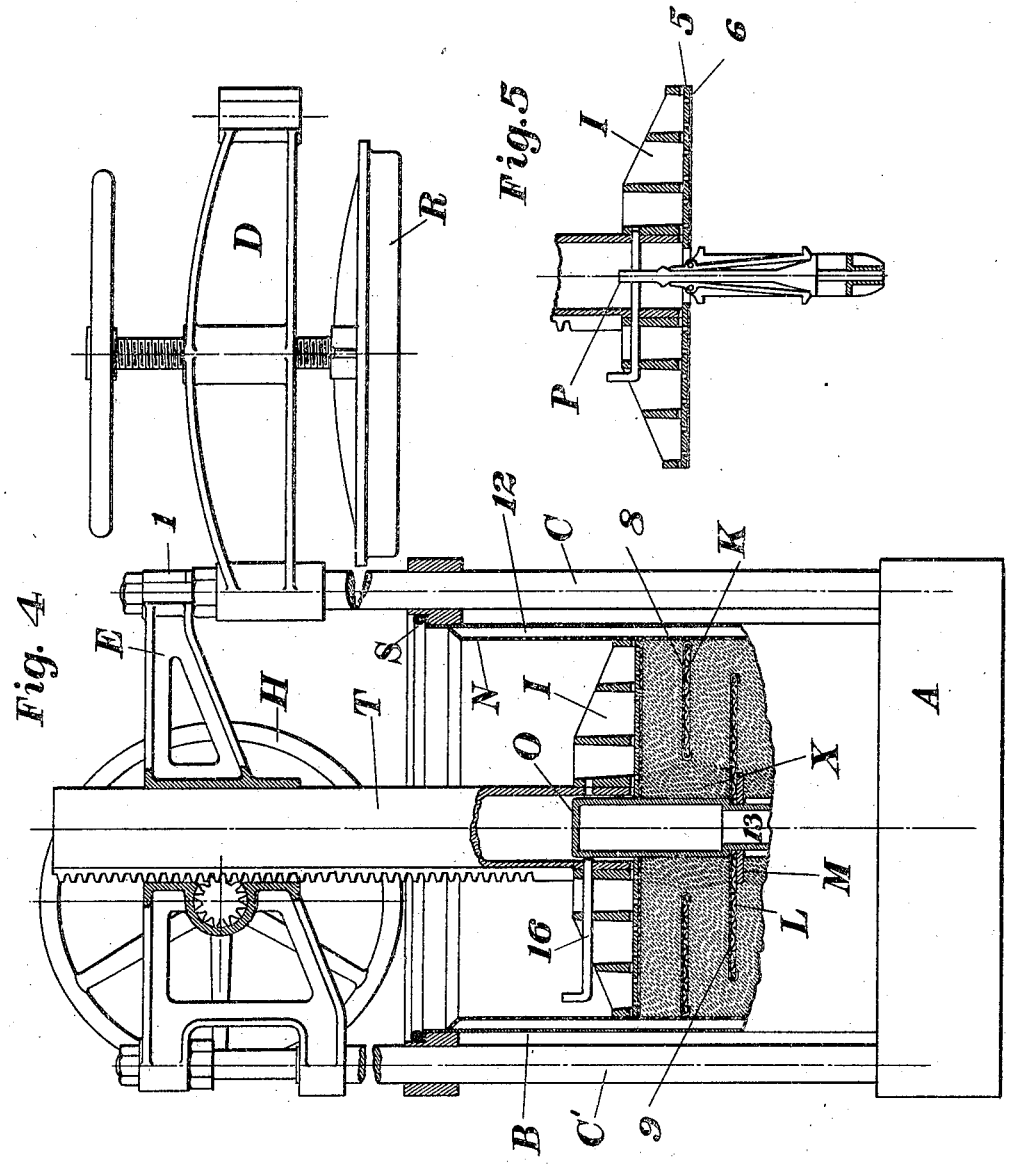

No. 812,934. PATENTED FEB. 20, 1906.
K. KIEFER.
FILTER.
APPLICATION FILED NOV. 21, 1904.

4 SHEETS—SHEET 4.

Witnesses.
G. W. Worden
H. L. Rambrau

Inventor.
Karl Kiefer

UNITED STATES PATENT OFFICE.

KARL KIEFER, OF CINCINNATI, OHIO.

FILTER.

No. 812,934.   Specification of Letters Patent.   Patented Feb. 20, 1906.

Application filed November 21, 1904. Serial No. 233,647.

*To all whom it may concern:*

Be it known that I, KARL KIEFER, a citizen of the United States, and a resident of Cincinnati, in the county of Hamilton and State of Ohio, have invented new and useful Improvements in a Filter, of which the following is a specification.

The object of my invention is to provide improved means for the filtration of liquids, and these improvements are illustrated in the accompanying drawings, of which—

Figure 6:
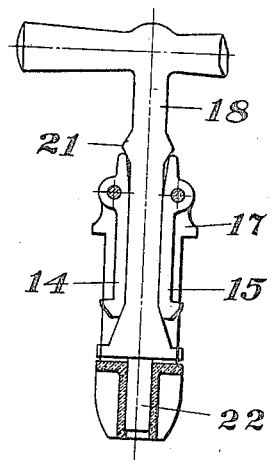
Figure 7:
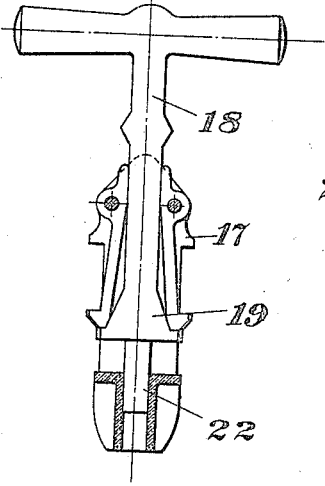
Figure 8:
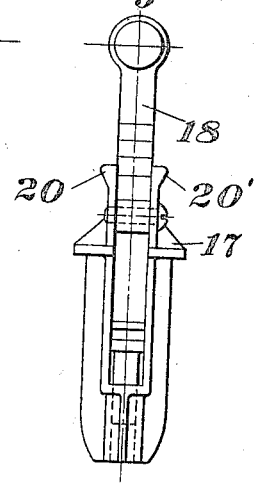
Figure 9:
Figure 10:
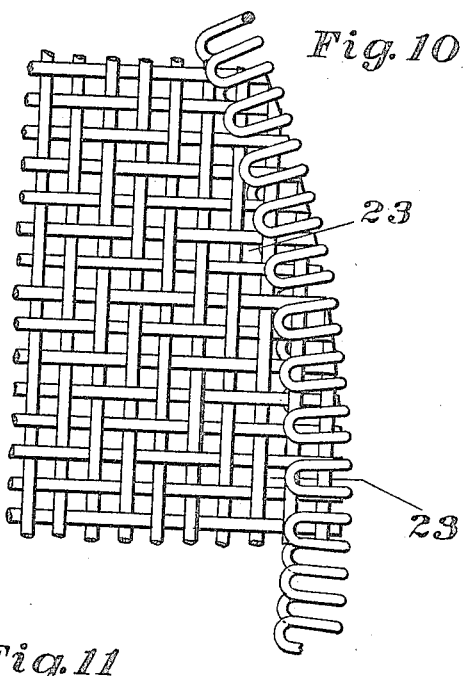
Figure 11:

Figure 1 is a vertical cross-section through my improved filter, showing the operation of packing the filter layers and the filter-cover swung aside. Fig. 2 is a cross-section through the press-plate; Fig. 3, a vertical cross-section through my filter, showing the lifting out after use of the filter layers by means of the packing arrangement. Fig. 4 shows a vertical cross-section through the filter with a modified packing arrangement. Fig. 5 shows a detail of the press-plate with the lifting-tool attached. Figs. 6, 7, and 8 are three detail views of the lifting instrument. Fig. 9 shows a side view of the novel binding used on the liquid-conductors. Fig. 10 shows a top view of this binding attached to part of the liquid-conductor. Fig. 11 shows a cross-section of the liquid-conductor with this new wire binding.

In Fig. 1, A is a base containing an inlet and outlet opening, such as used in my patent application, Serial No 155,674, filed May 4, 1903, patented February 7, 1905, No. 782,200, reissued May 16, 1905, No. 12,347. B is a drum inclosing the filter elements. C and C' are upright posts fastened on the base A. D is a swinging yoke suspending the cover of the drum. E is a swinging traverse hinged on the upright post C', so as to swing out similarly to yoke D. It swings into place, hooking onto the upright post C with its part 1, that is cut out one-half. This traverse E carries on both sides a rack F and F', the latter one visible in Fig. 2, and a pinion arrangement G, actuating the racks F and F' On the same shaft with the pinions is a hand-wheel H. The rack is guided by rollers 3 and 4, which are also in duplicate on each side of the traverse E. Connected to the racks F and F' is a packing-plunger I with a perforated plate 5, a fine screen 6, and a central hole 7. The inlet liquid-conductors consist of large screens K for the admission of the liquid, are of coarse mesh, and covered with a fine-fiber retaining-screen 8. The outlet liquid-conductors consist of coarse screens L of a smaller diameter, also covered with fiber retaining-screen 9 and a strengthening-disk M. The smaller liquid-conductors L have central holes of somewhat smaller diameter than the filter mass X. Liquid, therefore, coming from these conductors communicates with the central opening common to all filter layers. Like in my specification No. 782,200, patented February 7, 1905, reissue No. 12,347, May 16, 1905, the inlet for the cloudy liquid is a very narrow space 12, Fig. 1, produced by the tank B and open-work cylinder N, while the outlet for the clear liquid is in the center. The bottom of the tank is covered with the large screen K and the fiber retaining-screen 8, below which the cloudy liquid enters and above which the first layer is packed by means of the packing-piston I, the exterior open-work cylinder N, and the interior auxiliary cylinder O. The filter mass is introduced in a state mixed with a good deal of water and then pressed by the piston I and the pressure arrangement above, so that a ring-shaped filter layer is formed between the open-work cylinder N, the interior cylinder O, the screen-plate, and the packing-piston. More pulp should be used at the center, so that the filter layers are more dense at their centers, as indicated by the double section-line. After the first layer is produced an outlet-screen, with the ring M, is put on top of the first layer. Then the auxiliary cylinder O is introduced, which properly centers the hub M by its lower prolongation 13, which can enter the outlet-opening. Thereupon the second filter layer is produced. After the introduction of two filter layers the auxiliary cylinder O is withdrawn. The smaller liquid-conductor L, covered with a fine screen 9, is placed on top. Thereupon the cylinder O is placed again in the center hole of the liquid-conductor and the lower part 13 by entering the center of the previous liquid-conductor L centers the upper liquid-conductor. This position is clearly shown in Fig. 1. After all the filter layers are packed the press arrangement is swung aside and the yoke D swung in position, whereupon all the filter layers are pressed once more by the cover R, that finally seats itself on the rubber gasket S, and therewith closes the whole filter-casing air-tight.

In Fig. 3 the method of unpacking the filter is shown. The lifting-tool P, which will be described more in detail later on, is inserted into the center of the filter-plates far down enough so that the two fingers 14 and 15, Figs. 6 and 7, will catch the small liquid-conductor on the strengthening-plate M. The lifting-tool is lowered by means of the packing arrangement. It is inserted in the center hole of the packing-plate and held there by means of its key-handle. The lifting-tool is arranged so that it will by withdrawing automatically grip the small liquid-conductor before withdrawal of the packing-plate by means of a hand-wheel and rack arrangement. Fig. 4 shows a different press arrangement, consisting of a hollow tube T, rigidly fastened to which is a single rack. A single gear attached to the hand-wheel moves this tube. The tube is fastened to the press-plate, and the key 16 is inserted into the loop of the lifting-tool P, as shown in Fig. 5, for the purpose of unpacking the filter mass. This latter arrangement has the advantage of being more easily manufactured, everything being circular and the roller arrangement being dispensed with.

I will now describe the lifting-tool, which automatically grips the liquid-conductor L when lowered by the press arrangement. The lifting-tool consists of four parts—the frame part 17, handle part 18, and two fingers 14 and 15. If the handle part 18 is held and the frame part carrying the fingers is allowed to drop, as shown in Fig. 7, the two fingers are seen to be spread by the inclined-plane part 19. If, however, the frame part 17 is held by means of the two projections 20 and 20', as shown in Fig. 8, the handle part drops and by means of the inclined-plane part 21, as shown in Fig. 6, spreads the upper part of the fingers 14 and 15, which causes the fingers 14 and 15 to release their hold. The handle part 18 is guided on the frame part 17 by means of a cylindrical guide 22.

I will now describe the wire binding, which is of special construction.

It is evident that the inlet liquid-conductors K have to be supplied with liquid laterally through the pores of the perforated drum or casing N. A slight sheet-metal binding as used commonly for strengthening the wire screens will not fulfil this purpose. My improved binding consists of a meander wire bound onto the frame, as shown in Figs. 9, 10, and 11. It affords rounded edges everywhere for the protection of the hands of the workman and has open channels 23 on both sides of the wire screens where the liquid can enter the screen. The compressed pulp, although pressed against this binding, cannot obstruct the flow of the liquid, as indicated by the arrows. The method of fastening to the screens is very simple. It is done by soldering. Another advantage of this binding is that it adapts itself to any curvatures of the screen.

The matter described in this specification, but not claimed, is claimed in my application, Serial No. 214,733, filed June 30, 1904.

What I claim as my invention, and desire to secure by Letters Patent, is—

1. In a filter, the combination of a series of filter layers interposed between which are liquid-conductors consisting of woven screens having a wire edge soldered on them.

2. In a filter of the class described, a liquid-conductor consisting of woven-wire screens and having a meander-wire edge.

3. In a filter, the combination of a series of filter layers, interposed between them liquid-conductors, consisting of woven screens, having a wire band at their edge to protect them, and spacing the filter layers apart at their edge, at the same time admitting liquid to the liquid-conductors.

4. In a filter, the combination of a series of filter layers of compressed pulp, an exterior drum, a base and two columns, a pressing device consisting of a single hollow tube in the center, attached to which is a rack, in combination with a gear and hand-wheel.

5. In a filter, the combination of a disk-shaped filter layer of compressed fibrous pulp, the center of which contains more fibers compressed to the same thickness as the rest of the disk, with means for supplying and draining said filter layer.

6. In a filter, the combination of a disk-shaped filter layer of compressed fibrous pulp, the center part of which is under greater compression and contains proportionately more filter mass than the rest of the disk, with means for supplying and draining said filter layer.

7. In a filter the combination of a drum or casing, of a series of filter elements contained within said drum, of a press arrangement for producing the filter elements within said casing, and of means attached to said press arrangement for extracting the filter layers after use.

8. In a filter, in combination with filter layers, a wire screen having a meander-wire edge.

In testimony whereof I have signed my name to this specification in the presence of two subscribing witnesses.

KARL KIEFER.

Witnesses:
G. W. WERDEN,
H. L. RAMBEAU.